(12) United States Patent
Maruyama

(10) Patent No.: US 12,355,358 B2
(45) Date of Patent: Jul. 8, 2025

(54) CONTROL CIRCUIT AND SWITCHING POWER SOURCE

(71) Applicant: FUJI ELECTRIC CO., LTD., Kanagawa (JP)

(72) Inventor: Hiroshi Maruyama, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 240 days.

(21) Appl. No.: 18/322,532

(22) Filed: May 23, 2023

(65) Prior Publication Data

US 2023/0421066 A1 Dec. 28, 2023

(30) Foreign Application Priority Data

Jun. 23, 2022 (JP) .................................. 2022-100996

(51) Int. Cl.
*H02M 3/335* (2006.01)
*H02M 1/00* (2006.01)
*H02M 1/32* (2007.01)

(52) U.S. Cl.
CPC ..... *H02M 3/33523* (2013.01); *H02M 1/0009* (2021.05); *H02M 1/325* (2021.05); *H02M 3/33515* (2013.01)

(58) Field of Classification Search
CPC ........... H02M 3/33523; H02M 1/0009; H02M 1/325; H02M 3/33515
See application file for complete search history.

(56) References Cited

U.S. PATENT DOCUMENTS

| | | | |
|---|---|---|---|
| 3,596,165 A * | 7/1971 | Andrews | H02M 3/3387 363/19 |
| 2017/0201181 A1* | 7/2017 | Yabuzaki | H02M 1/12 |

FOREIGN PATENT DOCUMENTS

JP 2003070247 A 3/2003

* cited by examiner

*Primary Examiner* — Adolf D Berhane
*Assistant Examiner* — Afework S Demisse

(57) ABSTRACT

Provided is a control circuit for controlling an ON period and an OFF period in a switching cycle of a switching element configured to perform switching control of a principal current flowing through a transformer of a switching power source, and performing control to turn off the switching element when an overcurrent is detected after an elapse of an invalidation period in the switching cycle and to set a period in which the switching element is turned on in the switching cycle to be minimum period or more, the control circuit including a shared timer unit configured to output a first timer signal for defining the invalidation period and a second timer signal for defining the minimum period.

20 Claims, 10 Drawing Sheets

CONTROL CIRCUIT AND SWITCHING POWER SOURCE

The contents of the following Japanese patent application(s) are incorporated herein by reference:
NO. 2022-100996 filed in JP on Jun. 23, 2022

BACKGROUND

1. Technical Field

The present invention relates to a control circuit and a switching power source.

2. Related Art

Up to now, a switching power source has been proposed which is configured to output a predetermined voltage or current by repeatedly shifting a switching element put into an ON state and an OFF state (see Patent Document 1, for example).

Patent Document 1: Japanese Patent Application Publication No. 2003-070247.

DESCRIPTION OF EXEMPLARY EMBODIMENTS

Figure 1:
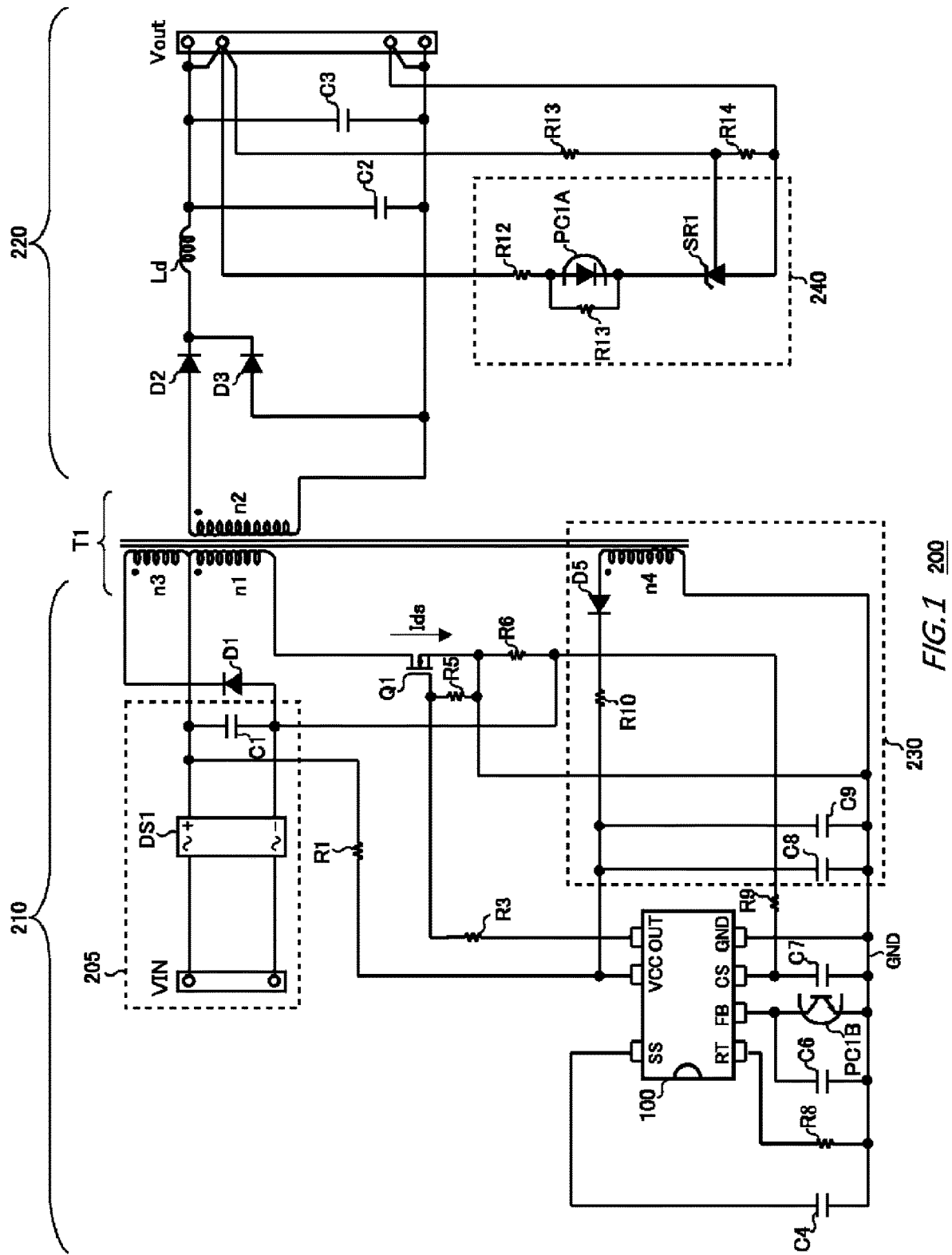
FIG. 1 illustrates an example of a switching power source 200 according to an embodiment of the present invention.

Hereinafter, the present invention will be described through embodiments of the invention, but the following embodiments do not limit the invention according to the claims. In addition, not all combinations of features described in the embodiment are essential to the solution of the invention. Note that in the present specification and drawings, the elements having substantially the same functions and configurations are denoted with the same reference signs, and the overlapping descriptions thereof are omitted. In addition, illustrations of the elements that are not directly relevant to the present invention are not omitted. In one drawing, elements having the same function and configuration are representatively denoted by a reference numeral, and the reference numerals for the others may be omitted. In the present specification, a case where a term such as "same" or "equal" is mentioned may include a case having an error due to a variation in manufacturing or the like. The error is within a range of 10% or less, for example.

FIG. 1 illustrates an example of a switching power source 200 according to an embodiment of the present invention. The switching power source 200 is configured to output a predetermined voltage or current by repeatedly controlling a switching element Q1 to be put into an ON state and an OFF state. The switching power source 200 in the present example is provided with a primary side circuit 210, a secondary side circuit 220, and a transformer T1. The switching power source 200 illustrated in FIG. 1 is, but not limited to, a so-called forward type circuit.

The primary side circuit 210 may include a power source circuit 205. The power source circuit 205 is configured to supply source power to the primary side circuit 210. An external AC power source (a voltage VIN) such as a commercial power source may be connected to the power source circuit 205 in the present example. The power source circuit 205 may have a diode bridge DS1 configured to rectify and smooth a voltage and current from an AC power source, and a capacitor C1.

The primary side circuit 210 has a control circuit 100, a primary side winding n1 of the transformer T1, a reset winding n3 of the transformer T1, a diode D1, and the switching element Q1. The primary side winding n1 in the present example is supplied with the source power from the power source circuit 205.

The secondary side circuit 220 has a secondary side winding n2 of the transformer T1, a diode D2, a diode D3, a secondary side coil Ld, and one or more capacitors (a capacitor C2 and a capacitor C3 in FIG. 1). The secondary side winding n2 is magnetically coupled to the primary side winding n1.

The switching element Q1 is connected in series to the primary side winding n1, and is configured to perform switching control on whether a principal current is caused to flow through the primary side winding n1. The switching element Q1 is, for example, a power MOSFET. The control circuit 100 is configured to control the ON state and the OFF state of the switching element Q1. The control circuit 100 may output a control signal to be input to a gate terminal of the switching element Q1. The control circuit 100 is, for example, an integrated circuit chip.

When the switching element Q1 is put into an on state and an excitation current flows through the primary side winding n1, a load current according to a turn ratio flows through the secondary side winding n2. The load current having flown through the secondary side winding n2 is rectified by the diode D2. In the present example, the diode D2 is arranged between a high voltage side terminal of the secondary side winding n2 and the secondary side coil Ld. The capacitors C2 and C3 are charged with the load current having passed through the secondary side coil Ld. An output voltage Vout is applied to the load according to amounts of charge accumulated in the capacitors C2 and C3.

When the switching element Q1 is put into the OFF state, the current flowing through the primary side winding n1 is interrupted, and an excitation current flows through the reset winding n3. The excitation current flows from the diode D1 to the reset winding n3 and is regenerated to the high voltage side of the power source circuit 205. When the switching element Q1 remains in the OFF state, the excitation current gradually decreases. In addition, the load current having flown through the secondary side winding n2 circulates via the diode D3. In the present example, the diode D3 is arranged between a low voltage side terminal of the secondary side winding n2 and the secondary side coil Ld.

After the excitation current flowing through the reset winding n3 has become 0, the excitation current flows from the low voltage side towards the high voltage side of the primary side winding n1 with a parasitic capacitance of the switching element Q1 as a power source. When the parasitic capacitance is discharged, the diode D2 of the secondary side circuit 220 is forward-biased to become conductive, and the excitation current flows through the secondary side winding n2. Subsequently, the switching element Q1 is put into the ON state. The operation described above is repeated for each switching cycle of the switching element Q1. The switching cycle includes a plurality of switching cycles by repeating the switching cycle in succession. A predetermined voltage and current are supplied to the load by causing the switching element Q1 to perform the switching operation in this manner.

The primary side circuit 210 may have a power source circuit 230 configured to supply the source power to a power source terminal VCC of the control circuit 100. The power source circuit 230 may generate the source power based on a current generated through the switching operation of the switching element Q1. The power source circuit 230 in the present example has an auxiliary winding n4, a diode D5, a resistor R10, one or more capacitors (a capacitor C8 and capacitor C9 in the example of FIG. 1).

The auxiliary winding n4 is arranged between a high voltage side terminal of the power source circuit 205 and a GND line. A resistor R1 may be arranged between the auxiliary winding n4 and the power source circuit 205. The auxiliary winding n4 is magnetically coupled to the secondary side winding n2. That is, a current according to a current of the secondary side winding n2 flows through the auxiliary winding n4. The diode D5 is arranged between a high voltage side terminal of the auxiliary winding n4 and the power source terminal VCC of the control circuit 100, and is configured to rectify the current flowing through the auxiliary winding n4. The resistor R10 is arranged between the diode D5 and the power source terminal VCC. The capacitors C8 and C9 are charged with the current having passed through the diode D5. Electrical power accumulated in the capacitors C8 and C9 is supplied as the source power of the control circuit 100.

At power-up when the switching operation of the switching element Q1 is not started, the capacitors C8 and C9 are charged via the resistor R1. When voltages of the capacitors C8 and C9 have risen to a predetermined starting voltage, the control circuit 100 is activated to cause the switching operation of the switching element Q1 to be started. After the switching element Q1 has started the switching operation, the capacitors C8 and C9 are charged with a current from the auxiliary winding n4, but when the switching operation of the switching element Q1 has stopped due to a protective operation or the like, the capacitors C8 and C9 are charged via the resistor R1. This allows the control circuit 100 to continuously operate.

The control circuit 100 has an OUT terminal from which a control signal OUT for controlling the switching element Q1 is output. The OUT terminal in the present example is connected to the gate terminal of the switching element Q1 via a resistor R3. A gate resistance of the switching element Q1 can be adjusted by the resistor R3. In addition, the gate terminal of the switching element Q1 may be connected to the GND line via a resistor R5. A reference potential line GND is connected to a GND terminal of the control circuit 100.

The primary side circuit 210 may have a resistor R6 with one end connected to a source terminal of the switching element Q1 and the other end connected to a low voltage side terminal of the power source circuit 205 (that is, to a common line of the primary side circuit 210). The other end of the resistor R6 is also connected to the reference potential line GND via a resistor R9 and a capacitor C7. The current having flown through the primary side winding n1 and the switching element Q1 flows to the low voltage side of the power source circuit 205 via the resistor R6.

The control circuit 100 has a CS terminal for sensing a magnitude of a principal current (a drain current Ids in the present example) flowing through the switching element Q1. The CS terminal takes in a potential of an end portion (the other end described above) of the resistor R6. A connecting portion that takes up the potential into the CS terminal may have a resistor R9 for connecting the CS terminal and the resistor R6 as well as a filter composed of a capacitor C7, as in the primary side circuit 210 in the present example. A potential of the other end portion (the one end connected to the switching element Q1 which has been described above) of the resistor R6 is input to the GND terminal of the control circuit 100 via the reference potential line GND. That is, a potential of the source terminal of the switching element Q1 and a potential of the GND terminal of the control circuit 100 are common. A potential difference according to a magnitude of the drain current Ids is generated between the both end portions of the resistor R6. Accordingly, a potential difference between the GND terminal and the CS terminal represents the magnitude of the drain current Ids. It should be noted that the potential of the CS terminal of the control circuit 100 in the present example swings to the negative side with respect to the potential of the GND terminal according to the magnitude of the drain current Ids.

The control circuit 100 may have an FB terminal to which a signal representing a magnitude of the output voltage Vout of the secondary side circuit 220 is input. The secondary side circuit 220 in the present example is provided with a voltage detection unit 240 configured to detect the magnitude of the output voltage Vout. The voltage detection unit 240 has a resistor R12, a light emitting diode PC1A, a resistor R13, and a shunt regulator SR1. A control input of the shunt regulator SR1 may be applied with a voltage obtained by dividing the output voltage Vout by the resistor R13 and a resistor R14. The shunt regulator SR1 is configured to draw a current when the voltage applied to the control input is higher than a predetermined reference voltage, and not to draw a current when the voltage applied to the control input is lower than the predetermined reference voltage. That is, the shunt regulator SR1 operates such that the output voltage Vout becomes a value represented by the following equation.

$$Vout = \text{reference voltage}/(R14 \times (R13+R14))$$

The resistor R12, the light emitting diode PC1A, and the shunt regulator SR1 are provided in series between an output terminal for outputting the output voltage Vout and the reference potential. The resistor R13 is arranged in parallel with the light emitting diode PC1A. The light emitting diode PC1A is configured to carry a current according to the output voltage Vout therethrough and is configured to output light having intensity according to a magnitude of the current.

The primary side circuit 210 has a light receiving element such as a phototransistor PC1B for receiving the light output by the light emitting diode PC1A. The phototransistor PC1B is configured to generate a current according to intensity of the received light. The phototransistor PC1B may be arranged between the FB terminal of the control circuit 100 and the GND line. As a result, the current according to the output voltage Vout flows through the FB terminal. The primary side circuit 210 may have a capacitor C6 provided in parallel with the phototransistor PC1B. This can remove a high frequency component of the current flowing through the FB terminal.

A voltage of the FB terminal varies according to the output voltage Vout. The voltage of the FB terminal in the present example becomes lower as the output voltage Vout is higher. The control circuit 100 controls a period in which the switching element Q1 is turned on and a period in which the switching element Q1 is turned off according to the voltage of the FB terminal. As an example, as the output voltage Vout is higher, the control circuit 100 shortens the period in which the switching element Q1 is turned on in respective switching cycles.

The control circuit 100 may have an SS terminal to which a capacitor C4 is connected. The capacitor C4 is connected to a point between the SS terminal and the GND line, and is charged with a voltage applied from the SS terminal. The capacitor C4 is charged at power-up of the switching power source 200, and is used for a soft start of the switching power source 200. An operation of the soft start will be described below.

The control circuit 100 may have an RT terminal. The RT terminal may be connected to the GND line via a resistor R8. The RT terminal is controlled to have a constant voltage, and a frequency of an oscillation signal which will be described below is controlled by a current flowing through the resistor R8.

As described above, the control circuit 100 controls the ON period and the OFF period in the respective switching cycles of the switching element Q1. In addition, the control circuit 100 may change a switching frequency (that is, a length of a switching cycle) of the switching element Q1 according to a load condition of the switching power source 200. As the load of the switching power source 200 is lighter, the voltage of the FB terminal falls. As the voltage of the FB terminal falls, the period in which the switching element Q1 is turned on is shortened in each switching cycle. As the ON period of the switching element Q1 is shortened, an ON loss in the switching element Q1 is reduced. On the other hand, when the switching frequency is constant, since the switching element Q1 periodically switches, a switching loss hardly changes. By lowering the switching frequency (that is, lengthening the switching cycle) as the load condition of the switching power source 200 is lighter (that is, the output voltage Vout is higher), the control circuit 100 in the present example decreases a switching frequency of the switching element Q1 to reduce the switching loss in the light load state.

When the ON period of the switching element Q1 is shortened, even when the switching element Q1 is caused to perform the switching operation, it is hardly possible to transmit any energy to the secondary side. As a result, the voltage of the FB terminal does not fall, and the switching frequency is less likely to fall. The control circuit 100 in the present example performs such control that the ON period of the switching element Q1 in each switching cycle becomes a predetermined minimum period or more. With this configuration, the switching frequency is stably decreased when the switching power source 200 is put into the light load state, and the switching loss can be reduced. The control circuit 100 times the minimum period by a timer circuit.

The control circuit 100 determines whether an overcurrent has flown through the switching element Q1 according to a voltage of the CS terminal. When the overcurrent is flowing through the switching element Q1, the control circuit 100 controls the switching element Q1 to be put into the OFF state. With this configuration, the switching element Q1 can be protected. On the other hand, immediately after the switching element Q1 has turned on, due to noise during the turn-on, it may be determined that an overcurrent has flown. Thus, even when the overcurrent is detected, the control circuit 100 invalidates the detection during a predetermined invalidation period from the turn-on of the switching element Q1. That is, the control circuit 100 turns off the switching element Q1 when the overcurrent is detected after the invalidation period has elapsed in the respective switching cycles. With this configuration, turn-off of the switching element Q1 due to an erroneous detection of the overcurrent can be suppressed. The control circuit 100 times the invalidation period by the timer circuit.

Since the minimum period and the invalidation period which have been described above are not necessarily the same, it is conceivable to provide the control circuit 100 with a timer circuit configured to time the minimum period and a timer circuit configured to time the invalidation period. However, a circuit scale is increased when the two timer circuits are provided. In particular, a timer circuit configured to charge a capacitor with a constant current and measure a period by comparing a charge voltage of the capacitor with a predetermined threshold has an analog circuit configured to charge the capacitor. Thus, the circuit scale is increased when timer circuits are respectively provided for the minimum period and the invalidation period. The control circuit 100 in the present example times the minimum period and the invalidation period which have been described above by a single shared timer unit. With this configuration, the circuit scale of the timer circuit can be reduced.

Figure 2:
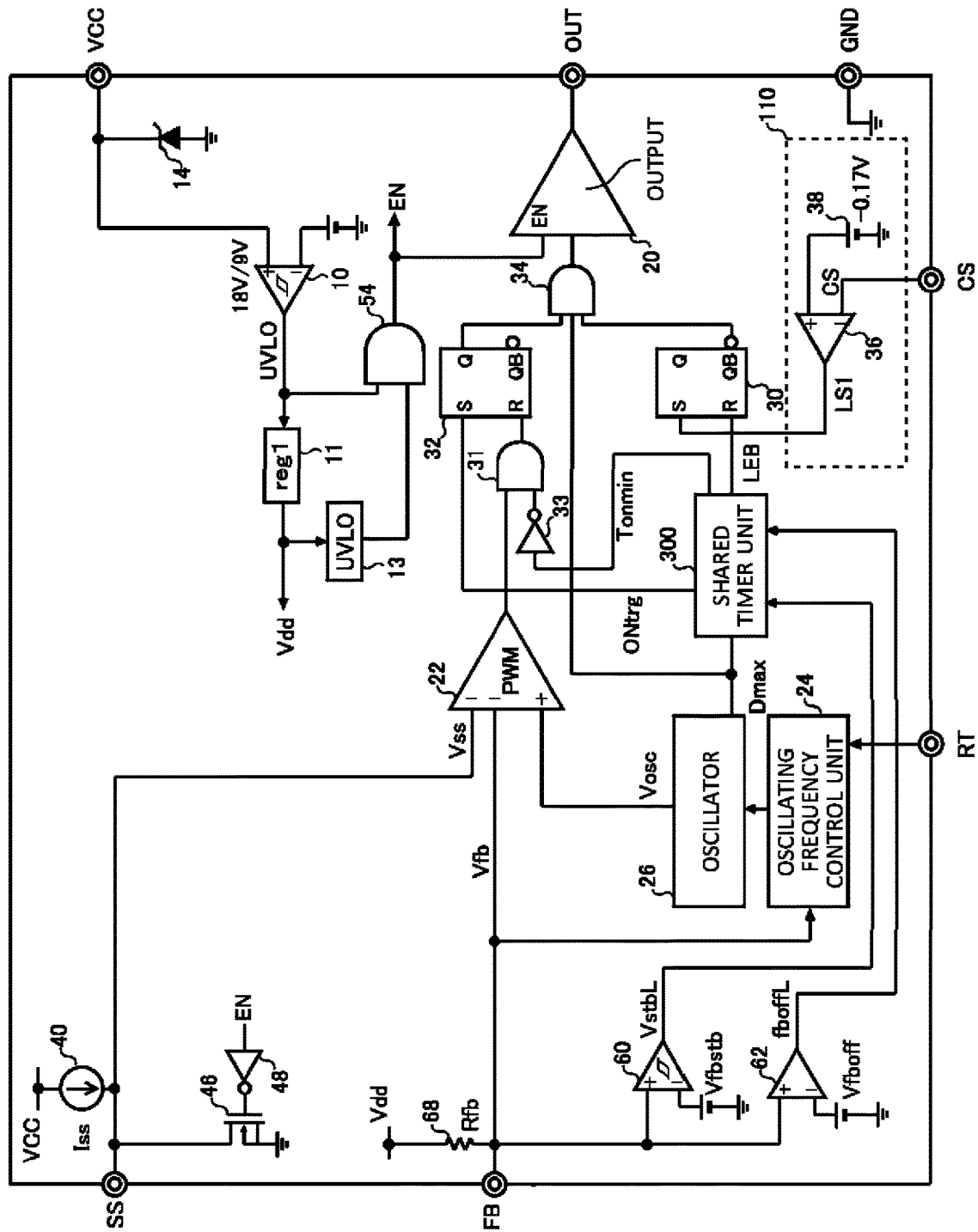
FIG. 2 illustrates a configuration example of a control circuit 100.

FIG. 2 illustrates a configuration example of the control circuit 100. The control circuit 100 in the present example has an internal power source 11 configured to generate an internal voltage based on electrical power supplied from a VCC terminal. The internal power source 11 generates an internal power source voltage Vdd. As an example, the internal power source voltage Vdd is 5 V. Each of circuits included in the control circuit 100 is configured to receive the power source voltage VCC or the internal power source voltage Vdd.

The control circuit 100 in the present example has a protective diode 14, a hysteresis circuit 10, and a protective circuit 13. The protective diode 14 is configured to clamp a VCC voltage such that a voltage at the VCC terminal does not become equal to or more than a predetermined voltage.

The hysteresis circuit 10 is configured to monitor whether the voltage at the VCC terminal has become a low voltage equal to or less than a predetermined value. The hysteresis circuit 10 outputs a protective signal UVLO which becomes an L level when the VCC voltage has been brought into a low voltage state and which becomes an H level when the VCC voltage has become a predetermined high voltage. When the protective signal UVLO is the L level, a voltage at the gate terminal of the switching element Q1 is fixed to the L level. This prevents the switching element Q1 from performing the switching operation when the VCC voltage is a low voltage. As an example, the hysteresis circuit 10 may set the protective signal UVLO to the L level when the VCC voltage has become 9 V or less. In addition, the hysteresis circuit 10 may shift the protective signal UVLO from the L level to the H level when the VCC voltage has become 18 V or more. For example, when the gradually rising VCC voltage has become 18 V or more when the switching power source 200 is activated or reactivated, the hysteresis circuit 10 sets the protective signal UVLO to the H level.

The protective circuit 13 is configured to monitor the internal voltage generated by the internal power source 11. The protective circuit 13 stops the switching operation of the switching element Q1 when any of the internal voltages has fallen out of a preset allowable range.

The control circuit 100 is provided with a PWM circuit 22, an oscillating frequency control unit 24, an oscillator 26, a shared timer unit 300, a control pulse generation unit 32, a logical conjunction circuit 31, an inverter 33, a logical conjunction circuit 34, and a control signal output unit 20. The control signal output unit 20 is configured to output the control signal OUT for controlling the switching element Q1 according to a control pulse to be input thereto. The control signal output unit 20 makes the output by level-shifting the control pulse to a signal from 0 V to the VCC voltage. That is, the control signal output unit 20 outputs 0 V when the control pulse represents the L level, and outputs the VCC voltage when the control pulse represents the H level. The switching element Q1 is put into the OFF state when the control signal is 0 V, and the switching element Q1 is put into the ON state when the control signal OUT is the VCC voltage.

Note that, the control signal output unit 20 outputs 0 V irrespective of the control pulse while a signal at the L level is input to an enable terminal EN. The hysteresis circuit 10 and the protective circuit 13 which have been described above stop the switching operation of the switching element Q1 by inputting the signal at the L level to the enable terminal EN of the control signal output unit 20.

The PWM circuit 22, the shared timer unit 300, the oscillator 26, and the control pulse generation unit 32 are configured to generate a control pulse. The oscillator 26 is configured to generate an oscillation signal for defining a cycle of the control pulse. The oscillating frequency control unit 24 is configured to control a frequency of the oscillation signal. The oscillator 26 may generate a triangular wave signal Vosc and a rectangular wave signal Dmax as the oscillation signal. A cycle of the oscillation signal may be set by a resistance value of the resistor R8 connected to the RT terminal. The triangular wave signal Vosc is in synchronism with the rectangular wave signal Dmax. In the present example, a signal level of the triangular wave signal Vosc increases during a period in which the rectangular wave signal Dmax is the H level, and the signal level of the triangular wave signal Vosc decreases during a period in which the rectangular wave signal Dmax is the L level.

The PWM circuit 22 is configured to compare a Vfb voltage at the FB terminal with the signal level of the triangular wave signal Vosc. The PWM circuit 22 in the present example outputs the H level during a period in which a voltage of the triangular wave signal Vosc exceeds the Vfb voltage, and outputs the L level during a period in which the voltage of the triangular wave signal Vosc is the Vfb voltage or less.

A resistor 68 is provided between the FB terminal and a high potential line (Vdd). As described above, the current according to the output voltage Vout flows through the FB terminal. The current flows through the resistor 68, so that the Vfb voltage of the FB terminal is determined by a resistance value Rfb of the resistor 68 and a value of the current. In the present example, the Vfb voltage decreases when the output voltage Vout increases, and the Vfb voltage increases when the output voltage Vout decreases.

The control pulse generation unit 32 generates a pulse in each cycle of the oscillation signal generated by the oscillator 26. Each cycle of the oscillation signal defines the switching cycle of the switching element Q1. The control pulse generation unit 32 in the present example is a set reset flip-flop. An ON trigger signal ONtrg which is output by the shared timer unit 300 is input to a set terminal of the control pulse generation unit 32. An output of the control pulse generation unit 32 shifts to the H level according to a rise of the ON trigger signal ONtrg. The shared timer unit 300 is configured to output the ON trigger signal ONtrg with a pulse width shorter than that of the rectangular wave signal Dmax in response to a rise edge of the rectangular wave signal Dmax.

An output terminal of the logical conjunction circuit 31 is connected to a reset terminal of the control pulse generation unit 32. The logical conjunction circuit 31 is configured to output a logical conjunction of an output of the PWM circuit 22 and an output of the inverter 33. The inverter 33 is configured to invert and output a second timer signal Tonmin which is output by the shared timer unit 300. The second timer signal Tonmin is a signal for defining a minimum period in which the switching element Q1 is to be maintained in the ON state at the time of the start of the respective switching cycles of the switching element. The second timer signal Tonmin in the present example is a signal representing the H level from start timing of the respective switching cycles until the minimum period has elapsed, and representing the L level after the minimum period has elapsed until start timing of the next switching cycle. That is, the second timer signal Tonmin is a signal which becomes the H level during a period in which the switching element Q1 is to be maintained in the ON state, and which becomes the L level during a period in which the switching element Q1 may be put into the OFF state. The shared timer unit 300 outputs the second timer signal Tonmin which becomes the H level for the minimum period from rise timing of the rectangular wave signal Dmax. The shared timer unit 300 may change the minimum period according to the load of the switching power source 200.

Since the inverter 33 inverts the second timer signal Tonmin to input an inverted signal to the logical conjunction circuit 31, while the second timer signal Tonmin represents the H level, the signal at the H level is not to be input to the reset terminal of the control pulse generation unit 32. With this configuration, the output of the control pulse generation unit 32 maintains the H level from the start timing of the respective switching cycles until the predetermined minimum period has elapsed. After the predetermined period has elapsed, the output of the control pulse generation unit 32 shifts to the L level when the signal which is output by the PWM circuit has become the H level. That is, the control pulse generation unit 32 outputs the H level until the predetermined minimum period has elapsed and also until timing at which the voltage of the triangular wave signal Vosc exceeds the Vfb voltage. With this configuration, the control pulse generation unit 32 outputs a control pulse with a pulse width adjusted according to a level of the Vfb voltage in the respective switching cycles.

The control pulse in the present example has a larger pulse width as the Vfb voltage is higher (that is, the output voltage Vout is lower), and has a smaller pulse width as the Vfb voltage is lower (that is, the output voltage Vout is higher). This suppresses a fluctuation of the output voltage Vout.

The logical conjunction circuit 34 may input a logical conjunction of the output of the control pulse generation unit 32 and the rectangular wave signal Dmax to the control signal output unit 20. With this configuration, an upper limit of the pulse width of each pulse of the control pulse can be defined by a pulse width of the rectangular wave signal Dmax. The logical conjunction circuit 34 may input, to the control signal output unit 20, a logical conjunction of the output of the control pulse generation unit 32, the oscillation signal (rectangular wave signal), and an inverted output of a set reset circuit 30. When an overcurrent of the switching element Q1 is detected, the set reset circuit 30 is configured to fix an output of the logical conjunction circuit 34 to the L level.

The control circuit 100 has a first protective unit 110. When the drain current Ids flowing through the switching element Q1 has exceeded a first threshold, the first protective unit 110 is configured to turn off the switching element Q1 to stop the drain current Ids. When the drain current Ids flowing through the switching element Q1 has exceeded the first threshold, the first protective unit 110 in the present example fixes the output of the control pulse generation unit 32 in the cycle of the oscillation signal to the L level. This can suppress an excessive current from flowing through the switching element Q1. A current detection signal CS representing the magnitude of the drain current Ids is input to the first protective unit 110 from the CS terminal. The current detection signal CS in the present example is a signal of a negative voltage an absolute value of which is larger as the drain current Ids is larger.

The first protective unit 110 has a voltage comparison unit 36 and a reference voltage generation unit 38. The reference voltage generation unit 38 is configured to generate a reference voltage corresponding to the first threshold described above. The reference voltage in the example of FIG. 2 is −0.17 V. The voltage comparison unit 36 is configured to compare the current detection signal CS with the reference voltage. The voltage comparison unit 36 outputs an H level current limiting signal LS1 when the current detection signal CS is lower than the reference voltage (when an absolute value of the current detection signal CS is larger than an absolute value of the reference voltage in the present example), and outputs an L level current limiting signal LS1 when the current detection signal CS is equal to or more than the reference voltage (when the absolute value of the current detection signal CS is equal to or less than the absolute value of the reference voltage in the present example).

The current limiting signal LS1 output by the voltage comparison unit 36 is input to a set terminal of the set reset circuit 30. A first timer signal LEB output by the shared timer unit 300 is input to a reset terminal of the set reset circuit 30. The first timer signal LEB is a signal for defining an invalidation period of the overcurrent detection described above. The first timer signal LEB in the present example is a signal representing the H level from the start timing of the respective switching cycles until the invalidation period has elapsed, and representing the L level after the invalidation period has elapsed until the start timing of the next switching cycle. That is, the first timer signal LEB is a signal which becomes the H level during a period in which the overcurrent of the switching element Q1 is not detected, and which becomes the L level during a period in which the overcurrent of the switching element Q1 is detected. The shared timer unit 300 outputs the first timer signal LEB that becomes the H level during the invalidation period from the rise timing of the rectangular wave signal Dmax.

An inverted output QB of the set reset circuit 30 is fixed to the H level from the start timing of each switching cycle until the invalidation period has elapsed, and shifts to the L level when the overcurrent of the switching element Q1 is detected after the invalidation period has elapsed until the start timing of the next switching cycle. When the inverted output QB of the set reset circuit 30 has become the L level, the control pulse in the cycle is interrupted by the logical conjunction circuit 34 to put the switching element Q1 into the OFF state. With this configuration, when the overcurrent is detected after the invalidation period has elapsed, the switching element Q1 in the cycle is controlled to be off, and an increase of the drain current Ids can be suppressed.

The oscillating frequency control unit 24 in the present example is configured to control an oscillating frequency of the oscillation signal which is output by the oscillator 26 according to a resistance value of the resistor R8 connected to the RT terminal. As described above, the oscillating frequency of the oscillation signal defines the switching frequency of the switching element Q1. In addition, the oscillating frequency control unit 24 controls the oscillating frequency in the oscillator 26 further based on the Vfb voltage at the FB terminal. The oscillating frequency control unit 24 may increase the oscillating frequency in the oscillator 26 as the Vfb voltage is decreased (that is, the load of the switching power source 200 is lighter). The oscillating frequency control unit 24 may determine whether the switching power source 200 is in a normal load state or a light load state based on the Vfb voltage, and set the oscillating frequency in the light load state to be greater than the oscillating frequency in the normal load state. With this configuration, a switching loss of the switching element Q1 in the light load state can be reduced.

The control circuit 100 may have a load determination unit 60. The load determination unit 60 is configured to determine whether the switching power source 200 is in the light load state or the normal load state by comparing the Vfb voltage with a predetermined reference voltage Vfbstb. The load determination unit is an example of a determination circuit. The load determination unit 60 is configured to output a light load signal VstbL representing the L level when the Vfb voltage is the reference voltage Vfbstb or less (that is, in the case of the light load state) and representing the H level when the Vfb voltage is greater than the reference voltage Vfbstb (that is, in the case of the normal load state). The shared timer unit 300 may change the minimum period for defining a minimum ON width of the switching element Q1 according to the light load signal VstbL. The shared timer unit 300 in the present example sets the minimum period during which the switching power source 200 is in the light load state to be longer than the minimum period of the normal load state. With this configuration, even when the switching power source 200 is put into the light load state, the ON width of the switching element Q1 can be maintained to be large to some extent, and energy to be transmitted to the secondary side in the respective switching cycles can be increased. With this configuration, the output voltage Vout can be maintained even when the oscillating frequency control unit 24 has reduced the switching frequency according to the load condition, and furthermore, when the load state has become the light load state, the switching frequency can be further reduced.

The control circuit 100 may have a stop determination unit 62. The stop determination unit 62 is configured to determine whether the output voltage Vout of the switching power source 200 becomes too high by comparing the Vfb voltage with predetermined reference voltage Vfboff. The reference voltage Vfboff may be lower than the reference voltage Vfbstb. For example, when the switching element Q1 is caused to perform the switching operation when the switching power source 200 is in a no load state, electrical power to be transmitted to the secondary side of the switching power source 200 is increased, and the output voltage Vout becomes too high to be an overvoltage. The stop determination unit 62 outputs a determination signal fboffL representing the L level when the Vfb voltage is the reference voltage Vfboff or less, and representing the H level when the Vfb voltage is greater than the reference voltage Vfboff. The shared timer unit 300 does not output the trigger signal ONtrg during a period in which the determination signal fboffL is the L level. With this configuration, when the output voltage Vout becomes an overvoltage, the switching operation of the switching element Q1 can be stopped.

A Vss voltage of the SS terminal may be input to the PWM circuit 22. The PWM circuit 22 may compare a lower one of the Vss voltage and the Vfb voltage with the triangular wave signal Vosc. A current Iss flows through the SS terminal by a current source 40. At power-up of the switching power source 200, the capacitor C4 connected to the SS terminal is charged with the current Iss, and the Vss voltage gradually rises. During a period in which the Vss voltage is lower than the Vfb voltage, since the PWM circuit 22 compares the Vss voltage with the triangular wave signal Vosc, the pulse width of the control pulse gradually increases according to the Vss voltage. This can gradually increase the drain current Ids at power-up of the switching power source 200 to make a soft start.

The control circuit 100 may have a transistor 46 provided between the SS terminal and a GND potential. The Vss voltage becomes the GND potential by putting the transistor 46 into the ON state. The control circuit 100 may have an inverter 48 configured to control the transistor 46. The inverter 48 in the present example inverts an enable signal EN output by a logical conjunction circuit 54 to input an inverted signal to the transistor 46.

The logical conjunction circuit 54 is configured to output a logical conjunction of the protective signal UVLO and the protective circuit 13 as the enable signal EN. The enable signal EN is input to the enable terminal EN of the control signal output unit 20. That is, when an abnormality is detected in either the protective circuit 13 or the hysteresis circuit 10, the logical conjunction circuit 54 stops the switching operation of the switching element Q1.

Figure 3:
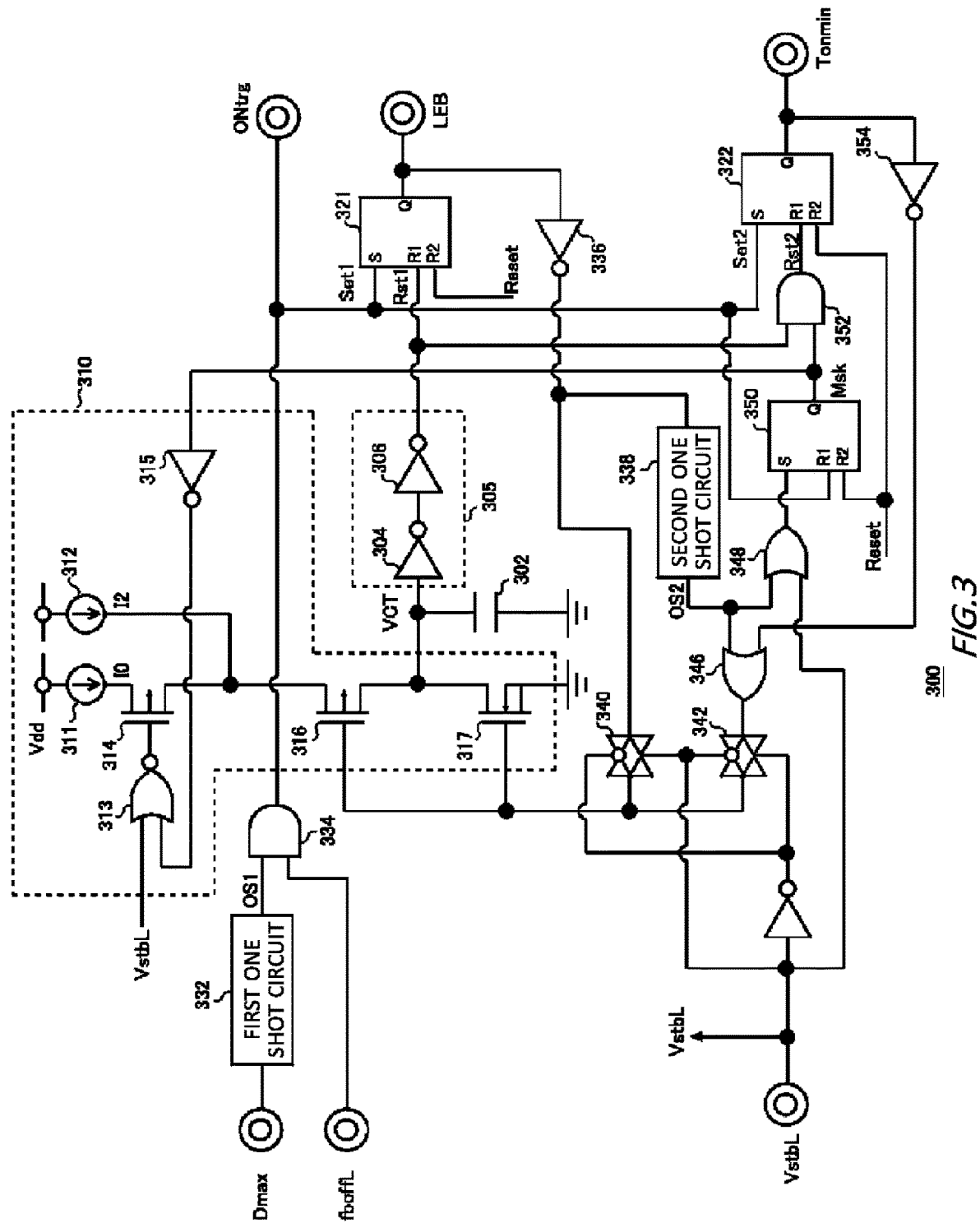
FIG. 3 illustrates a configuration example of a shared timer unit 300.

FIG. 3 illustrates a configuration example of the shared timer unit 300. The shared timer unit 300 in the present example times a remaining of the minimum period after the invalidation period has been timed. Start timing of the invalidation period and start timing of the minimum period in the present example are common to each other, and the minimum period is longer than the invalidation period. The start timing of the invalidation period and the minimum period may be the start timing of the respective switching cycles.

The shared timer unit 300 in the present example has a shared capacitor 302, a charge and discharge control unit 310, a comparison unit 305, an invalidation period output unit 321, a minimum period output unit 322, a first one shot circuit 332, a second one shot circuit 338, a flip-flop 350, a switch 340, a switch 342, and each of logical circuits. The logical circuits are an inverter (an inverted circuit), a logical conjunction circuit, a logical disjunction circuit, and the like. The shared timer unit 300 charges the shared capacitor 302 with a predetermined charge current, and times the minimum period and the invalidation period based on timing at which a charge voltage VCT of the shared capacitor 302 becomes a predetermined voltage.

The charge and discharge control unit 310 is configured to control an operation for charging and discharging the shared capacitor 302. The charge and discharge control unit 310 starts charge of the shared capacitor 302 at common start timing of the minimum period and the invalidation period. The common timing may also be common to the start timing of the ON period of the switching element Q1. In addition, the charge and discharge control unit 310 discharges the shared capacitor 302 when the charge voltage VCT of the shared capacitor 302 has reached a predetermined first setting voltage. The timing is end timing of the invalidation period. In addition, the charge and discharge control unit 310 charges the shared capacitor 302 again after the shared capacitor 302 is discharged. The charge and discharge control unit 310 discharges the shared capacitor 302 when the charge voltage VCT of the shared capacitor 302 has reached a predetermined second setting voltage. The timing is end timing of the minimum period. The first setting voltage and the second setting voltage in the present example are the same.

The comparison unit 305 is configured to output a signal representing whether the charge voltage VCT of the shared capacitor 302 has reached the first setting voltage or the second setting voltage. The comparison unit 305 in the present example has an inverter 304 and an inverter 306. The charge voltage VCT is input to the inverter 304. When the charge voltage VCT is a threshold voltage of the inverter 304 or more, an output of the inverter 304 becomes the L level, and when the charge voltage VCT is less than the threshold voltage, the output of the inverter 304 becomes the H level. That is, the threshold voltage of the inverter 304 in the present example corresponds to the first setting voltage and the second setting voltage. By using the inverter 304, it is possible to determine with a simple configuration whether the charge voltage VCT has reached the first setting voltage or the second setting voltage. The inverter 306 is configured to invert and output the output of the inverter 304.

The charge and discharge control unit 310 may set a charge current in a first period from the start of the charge of the shared capacitor 302 until the charge voltage VCT has reached the first setting voltage to be different from a charge current in a second period from the discharge of the shared capacitor 302 until the shared capacitor 302 is recharged and the charge voltage VCT has reached the second setting voltage. That is, the charge and discharge control unit 310 causes a value of the charge current for charging the shared capacitor 302 to vary before an end of the invalidation period and after the end of the invalidation period. With this configuration, a length of the first period and a length of the second period are respectively controlled, so that a length of the invalidation period and a length of the minimum period can be respectively controlled. The first period corresponds to the invalidation period, and a sum of the first period and the second period corresponds to the minimum period. Note that without the variation of the charge current, by setting the first setting voltage to be different from the second setting voltage, the length of the first period and the length of the second period can also be respectively controlled. In this case, the comparison unit 305 has a voltage comparator configured to compare the charge voltage VCT with respective setting voltages. By adjusting each of the periods by way of variation of the charge current, a configuration of the comparison unit 305 can be simplified.

The charge and discharge control unit 310 in the present example has a current source 311, a current source 312, a logical disjunction circuit 313, a switch 314, an inverter 315, a switch 316, and a switch 317. The current source 311 is configured to generate a current I0, and the current source 312 is configured to generate a current I2. The switch 314 is configured to select which current source is to be used for generating a charge current. In the present example, when the switch 314 is in the ON state, a sum of the current I0 and the current I2 becomes the charge current, and when the switch 314 is in the OFF state, the current I2 becomes the charge current. In the present example, the charge current is controlled depending on whether the current I0 is to be added to the current I2. In another example, the charge current may be controlled by alternatively selecting the current I0 and the current I2.

The logical disjunction circuit 313 is configured to control the switch 314. The logical disjunction circuit 313 inverts and outputs a logical disjunction of the light load signal VstbL illustrated in FIG. 2 and an output of the inverter 315. The inverter 315 is configured to output a signal representing the H level during the first period and representing the L level during the second period. That is, the logical disjunction circuit 313 outputs the H level during the second period and also when the light load signal VstbL represents the light load state. On the other hand, the logical disjunction circuit 313 outputs the L level when at least one of conditions that the period is the first period or that the state is the normal load state. When the logical disjunction circuit 313 outputs the H level, the switch 314 turns off, and the charge current becomes I2. When the logical disjunction circuit 313 outputs the L level, the switch 314 turns on, and the charge current becomes I0+I2. That is, in the light load state, the charge current I0+I2 during the first period is larger than the charge current I2 during the second period. Thus, the first period in the present example is shorter than the second period.

The switch 316 and the switch 317 are configured to switch an operation for charging or discharging the shared capacitor 302. The switch 316 and the switch 317 in the present example are complementarily operating CMOS transistors. When the switch 316 is on and the switch 317 is off, the shared capacitor 302 is charged, and when the switch 316 is off and the switch 317 is on, the shared capacitor 302 is discharged.

The first one shot circuit 332 is configured to output a one shot signal OS1 with a pulse width shorter than that of the rectangular wave signal Dmax in response to the rise edge of the rectangular wave signal Dmax. The one shot signal OS1 may be output from an ONtrg terminal as the ON trigger signal ONtrg. In the present example, a logical conjunction circuit 334 is configured to output a logical conjunction of the one shot signal OS1 and the determination signal fboffL as the ON trigger signal ONtrg. That is, when the output voltage Vout is not an overvoltage (fboffL=H), the logical conjunction circuit 334 outputs the one shot signal OS1 as the ON trigger signal ONtrg. That is, when the state is not an overvoltage state, the one shot signal OS1 and the ON trigger signal ONtrg refer to a same signal. The ON trigger signal ONtrg defines start timing of the respective switching cycles.

The invalidation period output unit 321 is configured to shift the first timer signal LEB to the H level in response to the ON trigger signal ONtrg. Similarly, the minimum period output unit 322 is configured to shift the second timer signal Tonmin to the H level in response to the ON trigger signal ONtrg. The invalidation period output unit 321 in the present example is a flip-flop configured to shift the output to the H level in response to a first set signal Set1, and to shift the output to the L level in response to a first reset signal Rst1. The minimum period output unit 322 in the present example is a flip-flop configured to shift the output to the H level in response to a second set signal Set2, shift the output to the L level in response to a second reset signal Rst2. The first set signal Set1 and the second set signal Set2 in the present example are ON trigger signals ONtrg. In addition, the first reset signal Rs1 is a signal output by the inverter 306, and the second reset signal Rst2 is a signal output by a reset control unit 352.

After the start timing defined by the ON trigger signal ONtrg, when the charge voltage VCT of the shared capacitor 302 has become the first setting voltage, the invalidation period output unit 321 outputs the first timer signal LEB representing the end timing of the invalidation period (or the first period). The invalidation period output unit 321 in the present example shifts the first timer signal LEB to the L level at timing at which the invalidation period has ended. In addition, at timing at which the invalidation period has ended, the invalidation period output unit 321 discharges the shared capacitor 302 and recharges the shared capacitor 302.

An output terminal of the inverter 306 is connected to a reset terminal R1 of the invalidation period output unit 321. That is, at timing at which the charge voltage VCT of the shared capacitor 302 where the charge has started at the start timing has reached the first setting voltage and an output of the inverter 306 has shifted to the H level, the first timer signal LEB shifts to the L level. A period in which the first timer signal LEB represents the H level corresponds to the invalidation period (the first period). Until the ON trigger signal ONtrg for starting the next switching cycle is input to a set terminal of the invalidation period output unit 321, an output of the invalidation period output unit 321 is fixed to the L level. A reset signal Reset for initializing the state of the control circuit 100 may be input to the invalidation period output unit 321. When the reset signal Reset is input, the output of the invalidation period output unit 321 shifts to the L level.

The first timer signal LEB is output to an LEB terminal, and is also input to control terminals of the switch 316 and the switch 317 via an inverter 336, the second one shot circuit 338, a logical disjunction circuit 346, and the switch 342. The inverter 336 is configured to invert and output the first timer signal LEB. The second one shot circuit 338 is configured to output a second one shot signal OS2 with a pulse width shorter than that of the first timer signal LEB in response to a rise edge of a signal output by the inverter 336. That is, the second one shot circuit 338 outputs the second one shot signal OS2 with a short pulse at timing at which the invalidation period (the first period) has ended.

The second one shot signal OS2 is input to the switch 342 via the logical disjunction circuit 346. The switch 340 and the switch 342 are configured to switch whether to control the switch 316 and the switch 317 by using any of an output of the inverter 336 or an output of the logical disjunction circuit 346. The switch 340 turns off in the case of the light load state (VstbL=L) and turns on in the case of the normal load state (VstbL=H). The switch 342 turns on in the case of the light load state (VstbL=L) and turns off in the case of the normal load state (VstbL=H). When the switch 340 is on, the output of the inverter 336 is input to the switch 316 and the switch 317, and when the switch 340 is off, the output of the logical disjunction circuit 346 is input to the switch 316 and the switch 317. That is, in the case of the light load state, charge and discharge of the shared capacitor 302 are controlled in response to the second one shot signal OS2. When the invalidation period has ended in the light load state, the second one shot signal OS2 that is a short pulse is input to the control terminals of the switch 316 and the switch 317, so that the switch 317 turns on, and the switch 316 turns off. With this configuration, when the invalidation period (the first period) has ended, the shared capacitor 302 is discharged during a period in which the second one shot signal OS2 is the H level. Note that when the one shot signal OS2 has become the H level, an output of the flip-flop 350 shifts to the H level, and the switch 314 turns off. Thus, when the invalidation period (the first period) has ended, the charge current decreases from I0+I2 to I2.

When the second one shot signal OS2 has become the L level, the switch 316 has turned on, and the switch 317 has turned off, so that recharge of the shared capacitor 302 is started. At timing at which the charge voltage VCT of the recharged shared capacitor 302 has reached the second setting voltage (that is the same as the first setting voltage in the present example) and the output of the inverter 306 has shifted to the H level again, the minimum period output unit 322 is reset, and the second timer signal Tonmin shifts to the L level. A period in which the second timer signal Tonmin represents the H level corresponds to the minimum period (the first period+the second period).

The reset control unit 352 is connected to the reset terminal R1 of the minimum period output unit 322. The reset control unit 352 is configured to output a logical conjunction of the output of the inverter 306 and a mask signal Msk output by the flip-flop 350. The flip-flop 350 outputs the L level during the first period, and outputs the H level during other periods. With this configuration, even when the output of the inverter 306 has shifted to the H level at the end timing of the first period, a second reset signal Rst2 to the minimum period output unit 322 is masked to the L level, and the second timer signal Tonmin maintains the H level. On the other hands, when the output of the inverter 306 has shifted to the H level again at the end timing of the second period, the second reset signal Rst2 shifts to the H level, and the minimum period output unit 322 is reset, so that the second timer signal Tonmin shifts to the L level. The reset signal Reset for initializing the state of the control circuit 100 may be input to the minimum period output unit 322. When the reset signal Reset is input, the output of the minimum period output unit 322 shifts to the L level.

An output terminal of a logical disjunction circuit 348 is connected to a set terminal of the flip-flop 350. The logical disjunction circuit 348 is configured to output a logical disjunction of the second one shot signal OS2 and the light load signal VstbL. That is, the logical disjunction circuit 348 inputs a signal at the H level to the set terminal of the flip-flop 350 when at least one of conditions that the state is the normal load state or that the second one shot signal OS2 represents the H level. The ON trigger signal ONtrg is input to the reset terminal R1 of the flip-flop 350. That is, the flip-flop 350 outputs the mask signal Msk at the L level from the shift of the ON trigger signal ONtrg to the H level until the first period has ended, and outputs the mask signal Msk at the H level after the first period has ended until the shift of the ON trigger signal ONtrg to the H level again. The reset signal Reset for initializing the state of the control circuit 100 may be input to the flip-flop 350. When the reset signal Reset is input, the output of the flip-flop 350 shifts to the L level. With such an configuration, it is possible to generate the second timer signal Tonmin representing the H level during the minimum period and representing the L level in other periods.

An inverter 354 is configured to invert and input the second timer signal Tonmin to the logical disjunction circuit 346. The logical disjunction circuit 346 is configured to input a logical disjunction of the second one shot signal OS2 and an output of an inverter 354 to the control terminals of the switch 316 and the switch 317 via the switch 342. In accordance with the logical disjunction circuit 346, the shared capacitor 302 is maintained to be in a discharge state since the minimum period has ended until the next switching cycle starts.

Figure 4:
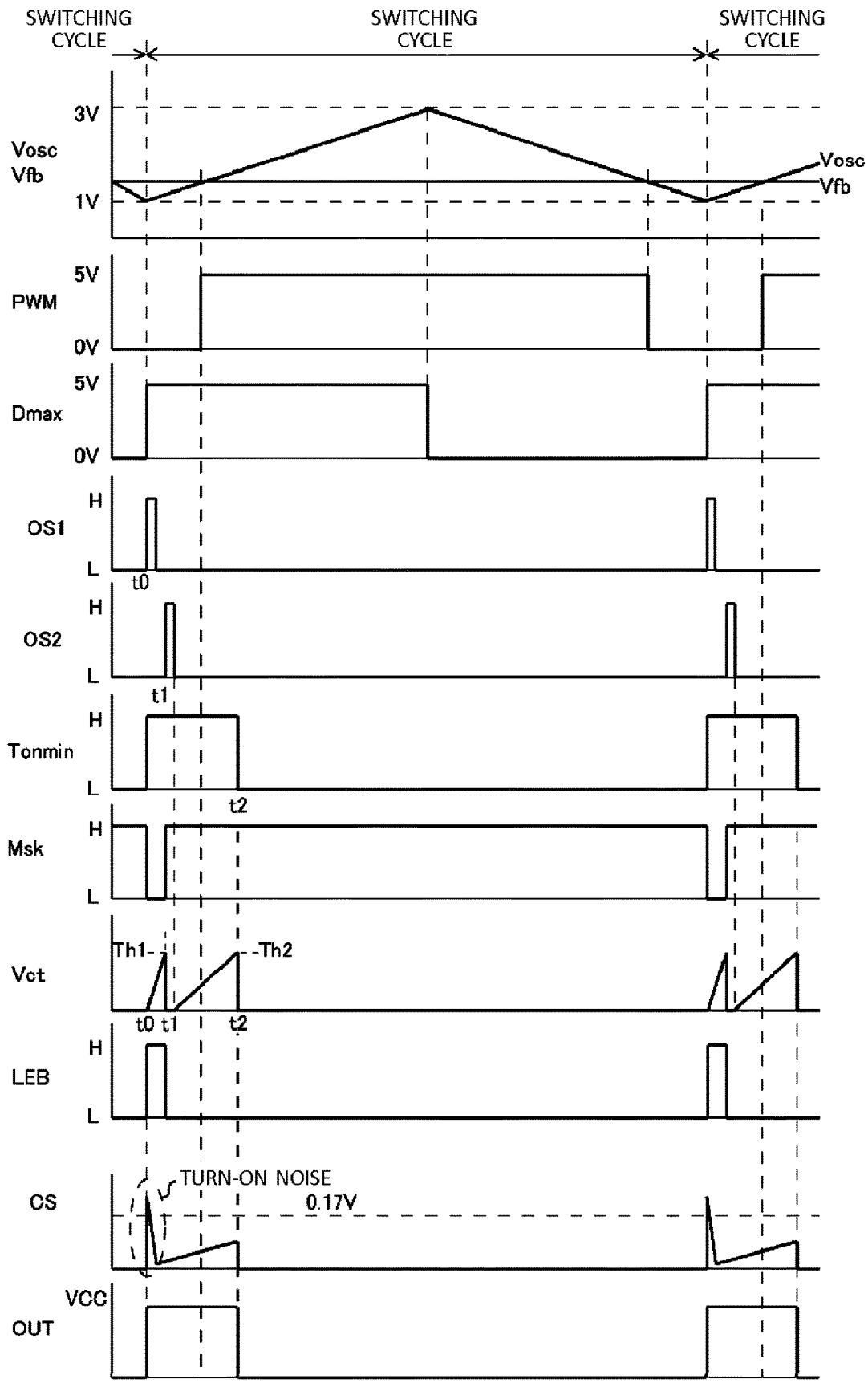
FIG. 4 is a timing chart representing an operation example of the control circuit 100 in a light load state (VstbL=L).

FIG. 4 is a timing chart representing an operation example of the control circuit 100 in the light load state (VstbL=L). The oscillator 26 in the present example generates the triangular wave signal Vosc that is to shift between 1 V and 3 V. In addition, the oscillator 26 outputs the rectangular wave signal Dmax in synchronization with the triangular wave signal Vosc. The rectangular wave signal Dmax becomes the H level during a period in which the triangular wave signal Vosc rises and becomes the L level during a period in which the triangular wave signal Vosc falls. In the light load state, the oscillating frequency control unit 24 decreases an oscillating frequency of the oscillator 26. Thus, a cycle of the triangular wave signal Vosc (corresponding to the switching cycle) becomes relatively long.

FIG. 4 illustrates the Vfb voltage together with the triangular wave signal Vosc. The PWM circuit 22 outputs the H level during a period in which the voltage of the triangular wave signal Vosc exceeds the Vfb voltage, and outputs the L level during a period in which the voltage of the triangular wave signal Vosc is the Vfb voltage or less.

The first one shot circuit 332 outputs the one shot signal OS1 with a short pulse width at start timing t0 of each switching cycle. The second timer signal Tonmin output by the minimum period output unit 322 and the first timer signal LEB output by the invalidation period output unit 321 shift to the H level in response to the one shot signal OS1. In addition, in response to the one shot signal OS1, charge of the shared capacitor 302 is started, and the charge voltage Vct increases. A gradient of the charge voltage Vct is defined by the charge current I0+I2.

At timing t1 at which the charge voltage Vct has reached a setting voltage Th1, the first timer signal LEB output by the invalidation period output unit 321 shifts to the L level. Note that during the first period (t0 to t1), since the mask signal Msk is the L level, at the timing t1, the minimum period output unit 322 is not reset, and the second timer signal Tonmin is maintained to the H level. In addition, at the timing t1, the second one shot circuit 338 outputs the second one shot signal OS2 with a short pulse width. With this configuration, the shared capacitor 302 is discharged. When the second one shot signal OS2 has shifted to the L level, the shared capacitor 302 is recharged. In the present example, since the gradient of the charge voltage Vct at the time of the recharge is defined by the charge current I2, the gradient of the charge voltage Vct during the second period becomes gradual.

At timing t2 at which the charge voltage Vct has reached a second setting voltage Th2, the second timer signal Tonmin output by the minimum period output unit 322 shifts to the L level. In addition, when the second timer signal Tonmin has shifted to the L level, the shared capacitor 302 is discharged by the inverter 354 or the like. In the present example, a period from the timing t0 to the timing t1 corresponds to the invalidation period and the first period, a period from the timing t1 to the timing t2 corresponds to the second period, and a period from the timing t0 to the timing t2 corresponds to the minimum period. In the present example, the second period is longer than the first period.

When the one shot signal OS1 has been generated at the timing t0, the control signal OUT for the switching element Q1 shifts to the H level, and the switching element Q1 turns on. As described above, during the turn-on of the switching element Q1, turn-on noise may be generated in the current detection signal CS, and an overcurrent may be erroneously detected. In the present example, the overcurrent detection during the invalidation period t0 to t1 is invalidated by the first timer signal LEB. Thus, the erroneous detection of the overcurrent can be suppressed.

The control pulse generation unit 32 outputs the control signal OUT having a pulse width from a moment when a one shot pulse has been input to timing at which the voltage of the triangular wave signal Vosc exceeds the Vfb voltage. In the present example, during the second period t1 to t2, the voltage of the triangular wave signal Vosc exceeds the Vfb voltage. However, the control signal OUT maintains the H level during the minimum period t0 to t2 by the second timer signal Tonmin. With this configuration, a state where the ON period of the switching element Q1 becomes too short can be suppressed, and the switching frequency can be appropriately reduced, so that the switching loss can be suppressed.

When a light load operation is to be performed as described in FIG. 4, by using the invalidation period and the minimum period, the control circuit 100 turns off the switching element Q1 when an overcurrent is detected after the elapse of the invalidation period in the respective switching cycles. In addition, the control circuit 100 controls a period in which the switching element Q1 is kept on to be the minimum period or more in the respective switching cycles. When the light load operation has been implemented in the switching cycle, when an overcurrent is detected after the elapse of the invalidation period but before the minimum period, the control circuit 100 may turn off the switching element Q1. The control circuit 100 may prioritize an operation for turning off the switching element Q1 when an overcurrent is detected over an operation for maintaining the switching element Q1 to the ON state during the minimum period.

Figure 5:
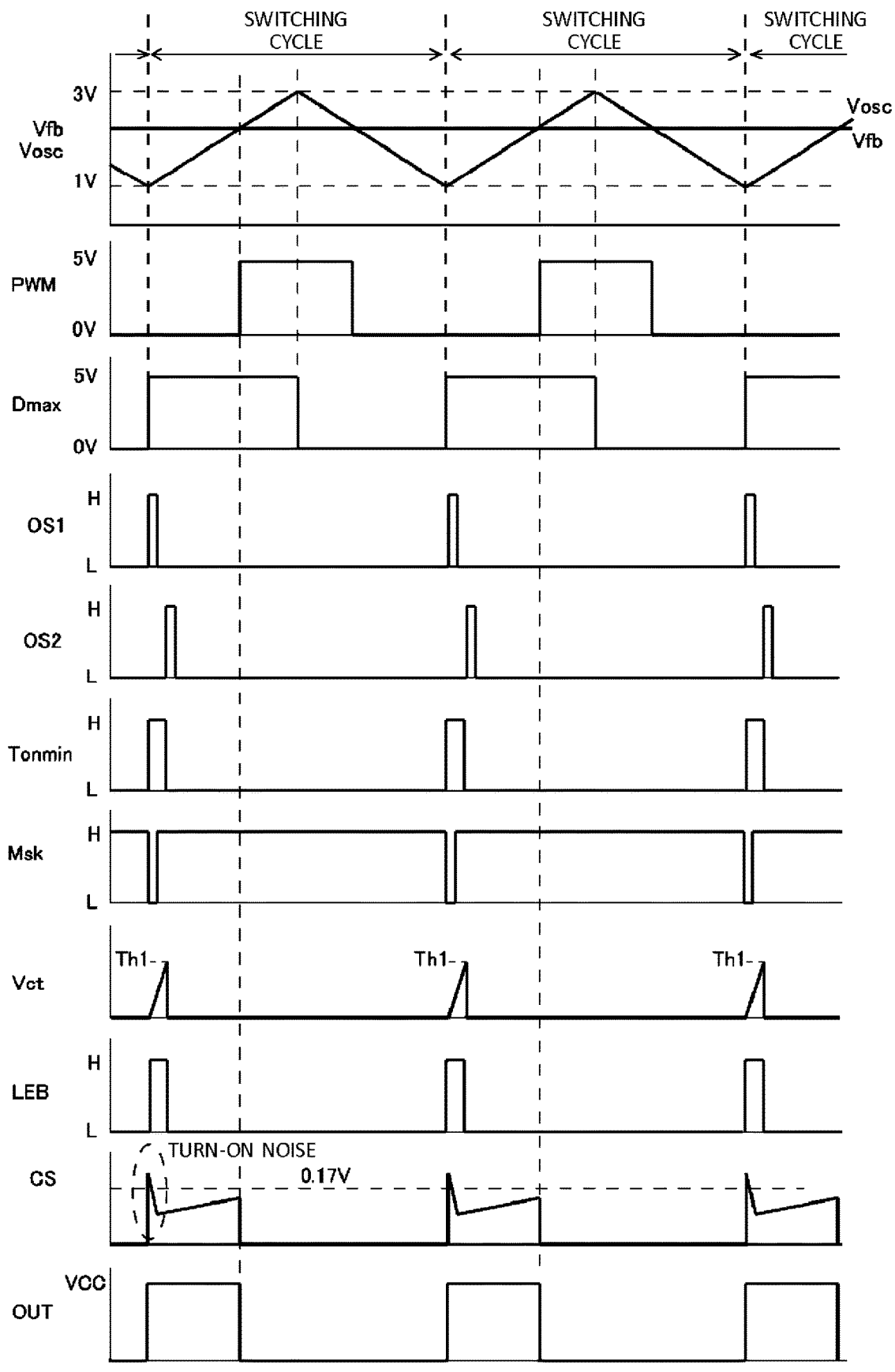
FIG. 5 is a timing chart representing an operation example of the control circuit 100 in a normal load state (VstbL=H).

FIG. 5 is a timing chart representing an operation example of the control circuit 100 in the normal load state (VstbL=H). As described in FIG. 3, in the case of the normal load state, the output of the logical disjunction circuit 313 is fixed to the L level, and the charge current is fixed to I0+I2. In addition, the switch 340 turns on, and the switch 342 turns off, so that charge and discharge of the shared capacitor 302 are controlled by the first timer signal LEB. That is, the shared capacitor 302 is charged when the first timer signal LEB is the H level, and the shared capacitor 302 is discharged when the first timer signal LEB is the L level. In addition, since an output of the logical disjunction circuit 348 is fixed to the H level, the mask signal Msk becomes the L level only during a period in which the one shot signal OS1 is the H level, and represents the H level in other periods.

The triangular wave signal Vosc and the rectangular wave signal Dmax are similar to the examples of FIG. 4. It is noted however that in the normal load state, the oscillating frequency control unit 24 increases the oscillating frequency of the oscillator 26. Thus, the cycle (corresponding to the switching cycle) of the triangular wave signal Vosc becomes relatively short. Similarly as in the example of FIG. 4, the PWM circuit 22 outputs the H level during a period in which the voltage of the triangular wave signal Vosc exceeds the Vfb voltage, and outputs the L level during a period in which the voltage of the triangular wave signal Vosc is the Vfb voltage or less.

The first one shot circuit 332 outputs the one shot signal OS1 with a short pulse width at the start timing of each switching cycle. The second timer signal Tonmin output by the minimum period output unit 322 and the first timer signal LEB output by the invalidation period output unit 321 shift to the H level in response to the one shot signal OS1. In addition, in response to the one shot signal OS1, charge of the shared capacitor 302 is started, and the charge voltage Vct increases.

At timing at which the charge voltage Vct has reached the setting voltage Th1, the first timer signal LEB output by the invalidation period output unit 321 shifts to the L level. In the normal load state, since the mask signal Msk at the timing is the H level, the second timer signal Tonmin output by the minimum period output unit 322 also shifts to the L level. That is, in the normal load state, the invalidation period and the minimum period are the same.

In addition, the second one shot circuit 338 outputs the second one shot signal OS2 with a short pulse width at timing at which the charge voltage Vct has reached the setting voltage Th1. In the present example, charge and discharge of the shared capacitor 302 are controlled by the first timer signal LEB. Thus, until the next switching cycle starts, the shared capacitor 302 is maintained to be in the discharge state.

In the present example too, the overcurrent detection during the invalidation period is invalidated by the first timer signal LEB. Thus, the erroneous detection of the overcurrent can be suppressed. In addition, a pulse width of the control signal OUT is restricted to be the minimum period or more by the second timer signal Tonmin. In the example of FIG. 5, since a period of time for the triangular wave signal Vosc to exceed the Vfb voltage is longer than the minimum period, the control signal OUT maintains the H level until the triangular wave signal Vosc exceeds the Vfb voltage. As illustrated in FIG. 5, the control circuit 100 when a normal operation is to be performed carries out, by using the invalidation period without using the minimum period, control for turning off the switching element when an overcurrent is detected after the elapse of the invalidation period in the respective switching cycles.

Figure 6:
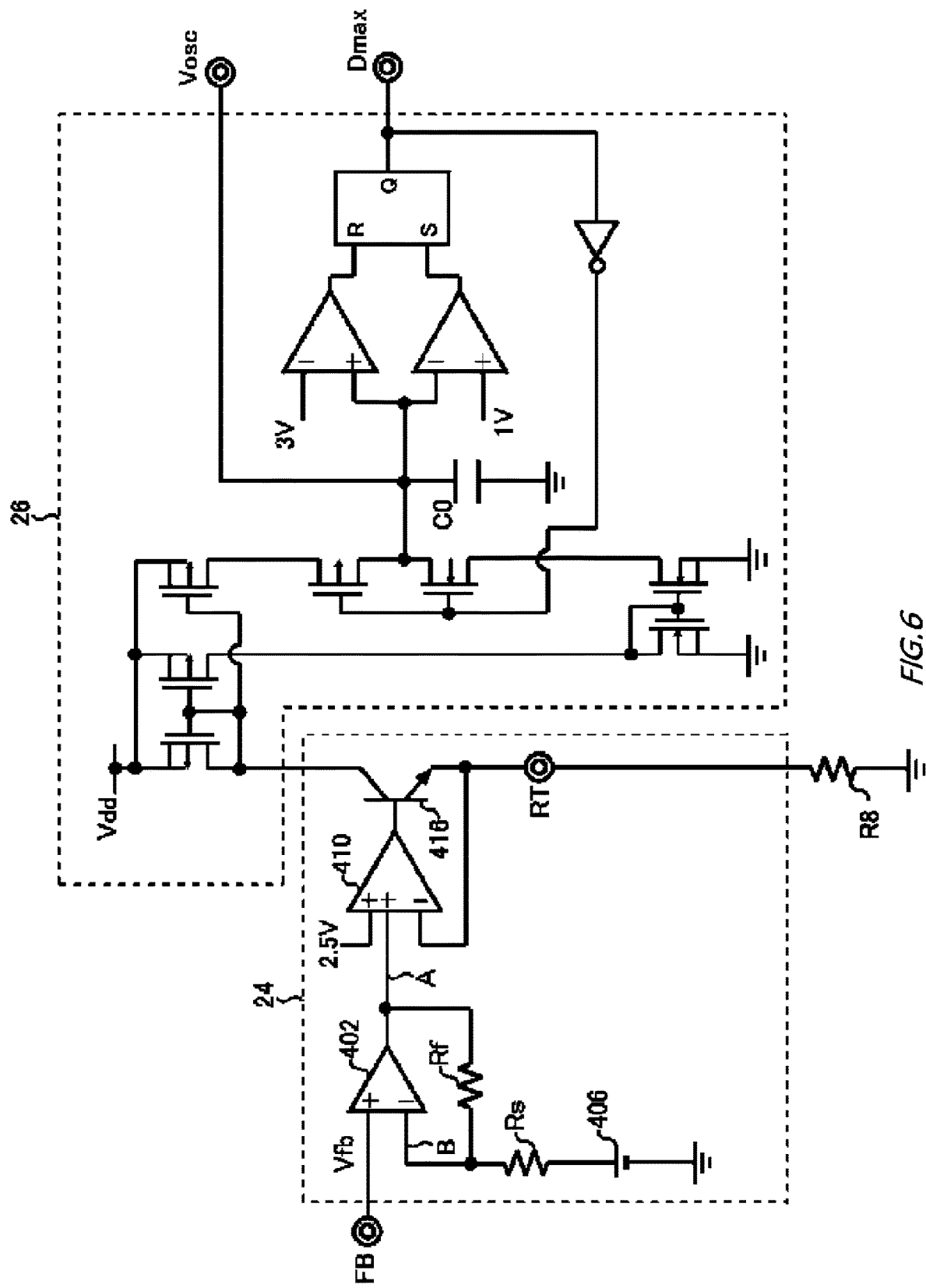
FIG. 6 illustrates a configuration example of an oscillating frequency control unit 24 and an oscillator 26.

FIG. 6 illustrates a configuration example of the oscillating frequency control unit 24 and the oscillator 26. The oscillating frequency control unit 24 in the present example has an amplifier 402, an amplifier 410, a transistor 416, a resistor Rs, a resistor Rf, and a power source 406.

In the amplifier 402, the Vfb voltage is input to a positive terminal, and a negative terminal and an output terminal are connected by the resistor Rf. In addition, the resistor Rs and the power source 406 are provided in series between the negative terminal of the amplifier 402 and a ground potential. A point connected to an output terminal of the amplifier 402 is set as a point A, and a point connected to the negative terminal is set as a point B. Since a voltage at the point B of the amplifier 402 becomes equal to the Vfb voltage, a voltage at the point A of the amplifier 402 becomes (Vfb−Vstb0)×(Rs+Rf)/Rs+Vstb0. Note that Vstb0 represents a voltage of the power source 406.

The output terminal of the amplifier 402 is connected to a first positive terminal of the amplifier 410. A second positive terminal of the amplifier 410 is applied with a constant voltage at 2.5 V, for example. The amplifier 410 is configured to operate by using a lower one of a voltage applied to the first positive terminal and a voltage applied to the second positive terminal. A negative terminal of the amplifier 410 is connected to an emitter terminal of the transistor 416. The amplifier 410 operates such that the lower one of the voltage applied to the first positive terminal and the voltage applied to the second positive terminal becomes equal to a voltage of the RT terminal.

An output terminal of the amplifier 410 is connected to a control terminal of the transistor 416. The emitter terminal of the transistor 416 is connected to the RT terminal. A collector terminal of the transistor 416 is connected to the oscillator 26. The oscillating frequency of the oscillator 26 is controlled by a collector current flowing through the transistor 416.

The oscillator 26 generates a mirror current according to the collector current, and charges a capacitor C0 with the mirror current. When a charge voltage has reached a predetermined voltage (for example, 3 V), the capacitor C0 is discharged. When the charge voltage has fallen to a predetermined voltage (for example, 1 V), the capacitor C0 is charged again. By repeating such an operation, the oscillator 26 generates the oscillation signal (Vosc, Dmax) having the oscillating frequency according to the collector current. A description on each of elements of the oscillator 26 will be omitted.

Figure 7:
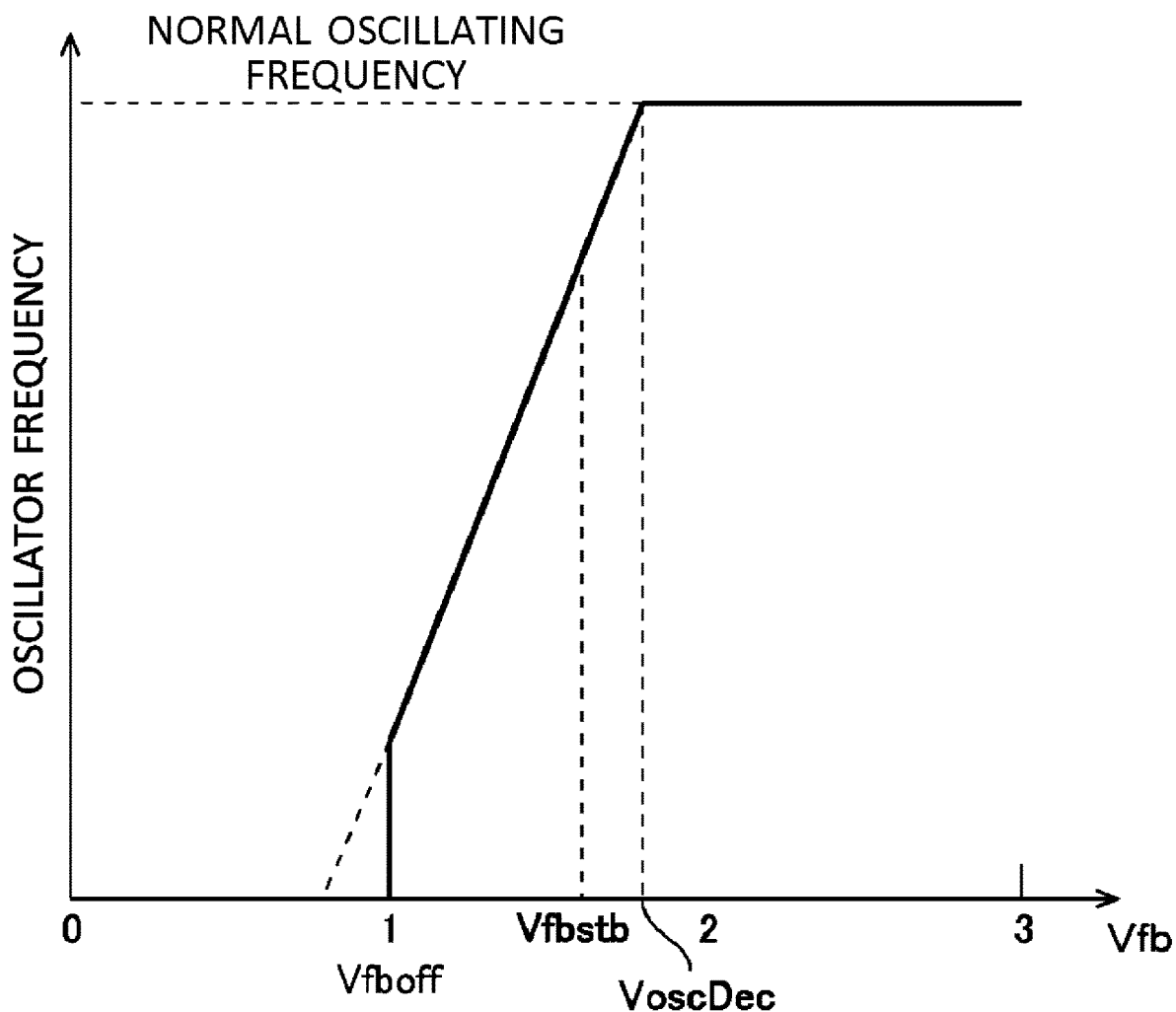
FIG. 7 illustrates a relationship between an oscillating frequency of the oscillator 26 and a Vfb voltage.

FIG. 7 illustrates a relationship between the oscillating frequency of the oscillator 26 and the Vfb voltage. The oscillating frequency during the normal load is represented as a normal oscillating frequency. The oscillator 26 oscillates at a constant normal oscillating frequency according to the resistor R8 connected to the RT terminal during the normal load. When the load is lightened, the output voltage Vout of the switching power source 200 rises, and the Vfb voltage falls.

Figure 8:
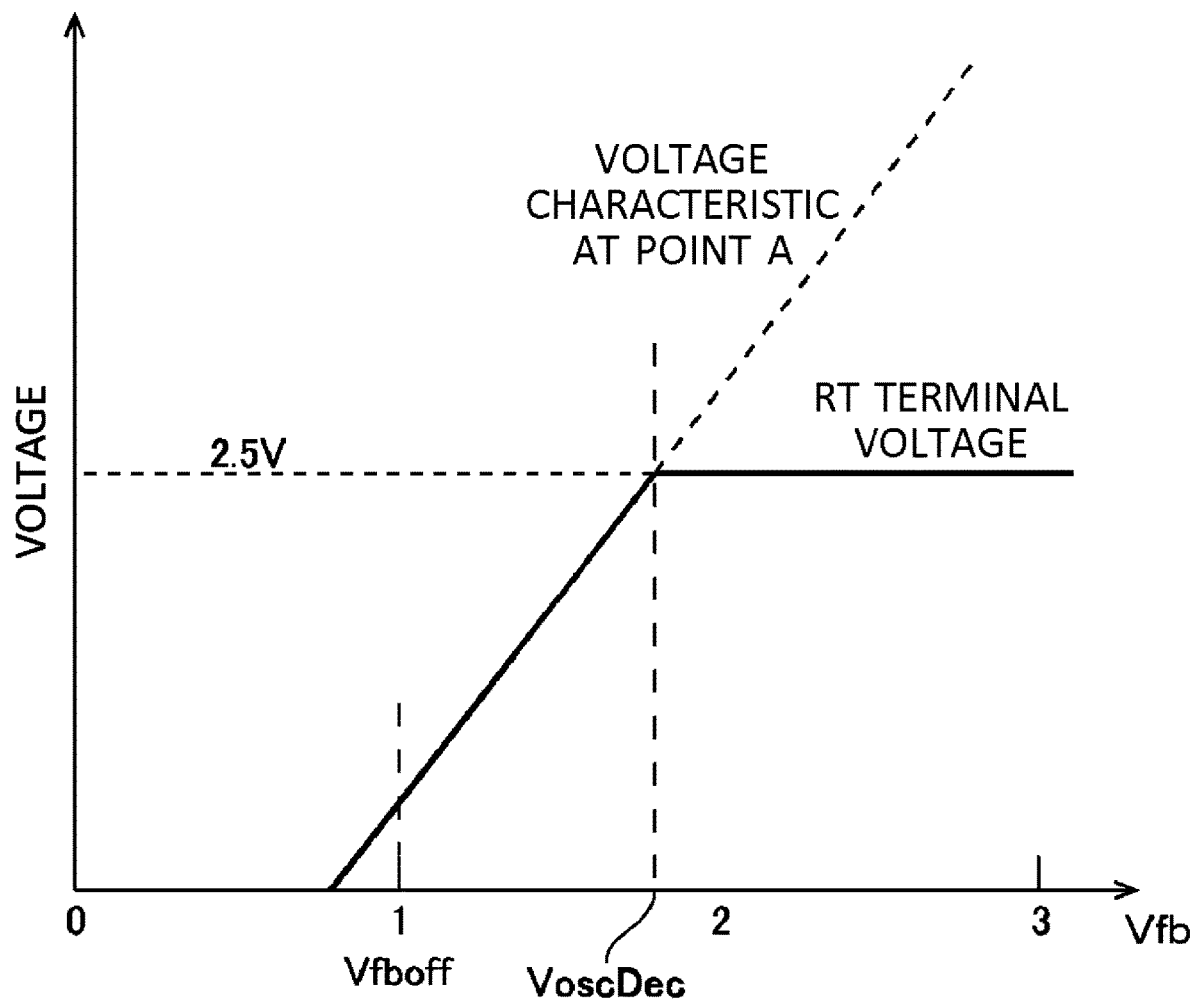
FIG. 8 illustrates a relationship between a voltage at an RT terminal and the Vfb voltage.

FIG. 8 illustrates a relationship between a voltage at the RT terminal and the Vfb voltage. In addition, a voltage characteristic at the point A of the amplifier 402 is represented by a broken line.

As illustrated in FIG. 8, when the Vfb voltage falls to a predetermined VoscDec, a voltage at the point A falls to 2.5 V, for example.

Since the amplifier 410 operates such that a lower one of the voltage applied to the first positive terminal and the voltage applied to the second positive terminal becomes equal to the voltage at the RT terminal, the voltage at the RT terminal also falls as the Vfb voltage decreases in a region where the Vfb voltage is VoscDec or less. Thus, a current flowing through the resistor R8 of the RT terminal also falls in proportion to the voltage at the RT terminal, and a charge and discharge current of the capacitor C0 of the oscillator 26 also falls at a same ratio. With this configuration, the oscillating frequency falls, and the switching frequency is reduced.

Figure 9:
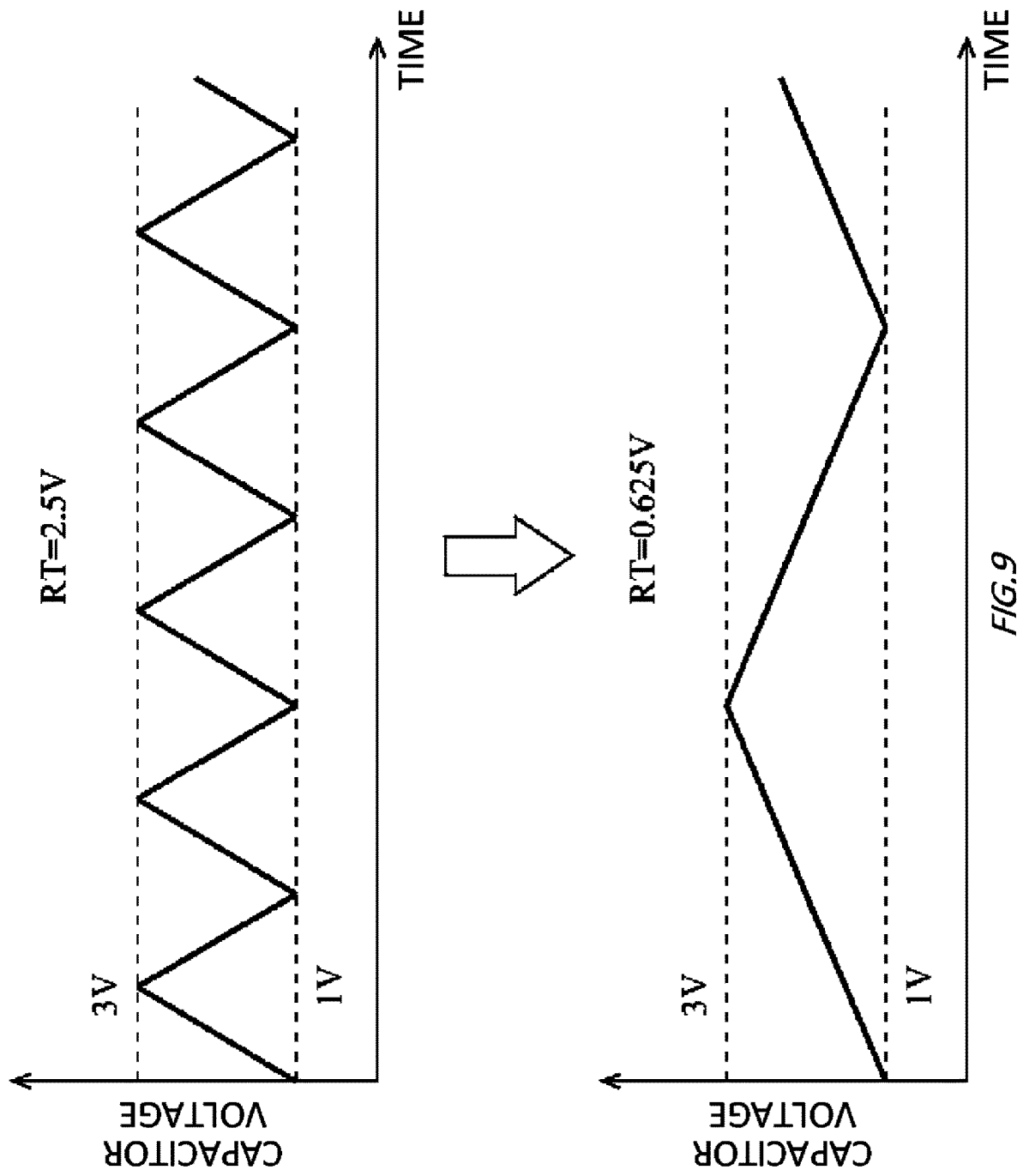
FIG. 9 illustrates a waveform of a charge voltage of a capacitor C0.

FIG. 9 illustrates a waveform of a charge voltage of the capacitor C0. As illustrated in FIG. 9, the oscillating frequency varies by a voltage RT at the RT terminal.

Figure 10:
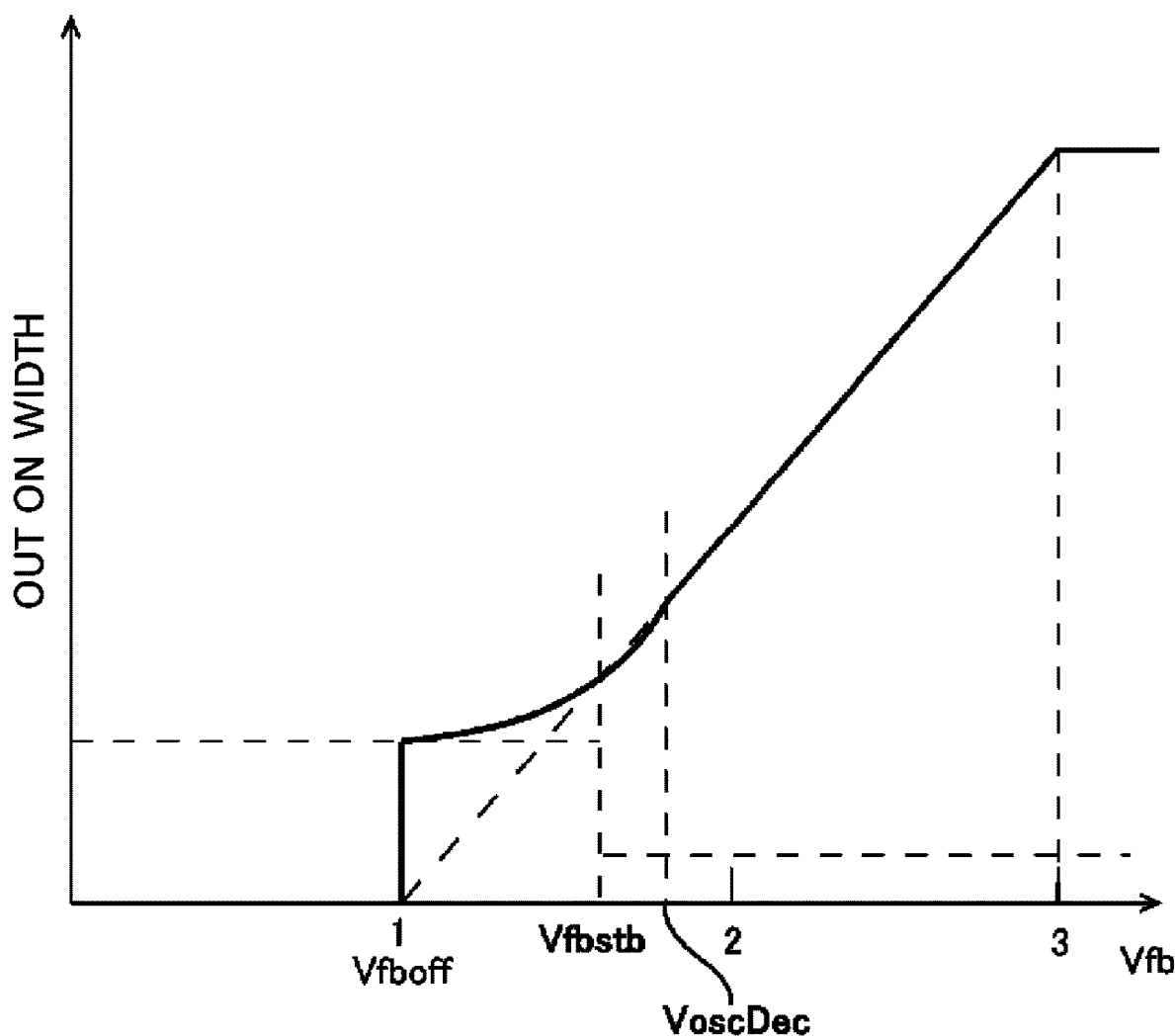
FIG. 10 illustrates a relationship between an ON width (pulse width) of a control signal OUT and the Vfb voltage.

FIG. 10 illustrates a relationship between the ON width (pulse width) of the control signal OUT and the Vfb voltage. In FIG. 10, a length of the second timer signal Tonmin during the light load and a length of the second timer signal Tonmin during the normal load are also illustrated. As illustrated in FIG. 10, when the Vfb voltage is Vfbstb or more, the second timer signal Tonmin during the normal load is set, and when the Vfb voltage is less than Vfbstb, the second timer signal Tonmin during the light load is set.

When the ON width of the control signal OUT is small during the light load, the ON loss is reduced, and an influence from the switching loss increases. In addition, since the Vfb voltage is less likely to fall, the switching loss is less like to be reduced, and the efficiency during the light load falls. Thus, the control circuit 100 sets the minimum ON width (length of the second timer signal Tonmin) during the light load to be large to some extent, and maintains the energy transmission amount to the secondary side by single switching to be large to some extent. With this configuration, the Vfb voltage is likely to fall, and the oscillating frequency is decreased to cause the switching frequency to fall, and the loss can be reduced.

When the load is lightened and the Vfb voltage becomes below Vfbstb, the second timer signal Tonmin is lengthened. Switching of the second timer signal Tonmin is performed by the load determination unit 60 (see FIG. 2) which is different from the frequency decrease in the oscillating frequency control unit 24. Since the ON width of the control signal OUT does not become narrower than the pulse width of the second timer signal Tonmin, when the pulse width of the second timer signal Tonmin has increased, the oscillating frequency is stabilized in a still lower state.

When the load is further lightened and the Vfb voltage falls to Vfboff, by the stop determination unit 62, the control signal OUT is fixed to the L level, and the switching operation of the switching element Q1 stops. When the load is lightened to this point, the Vfb voltage slowly increases and decreases in the vicinity of the Vfboff voltage. With this configuration, the switching element Q1 intermittently performs the switching operation to be stabilized in a state in which the switching frequency has further fallen.

During the normal load, as illustrated in FIG. 5, the Vfb voltage becomes high, and the pulse width of the control signal OUT increases. However, the load may rapidly change or the pulse width of the control signal OUT may rapidly change due to another factor. In this case too, when the pulse width of the second timer signal Tonmin increases similarly as in a time during the light load, the pulse width of the control signal OUT is forcedly maintained to be large, and sounding may occur or an instantaneous great current may flow through the switching element Q1. By setting the second timer signal Tonmin during the normal load to be small, the occurrence of sounding or the instantaneous great current can be suppressed.

While the present invention has been described by way of the embodiments, but the technical scope of the present invention is not limited to the scope of the above described embodiments. It is apparent to persons skilled in the art that various alterations and improvements can be added to the above described embodiments. It is also apparent from the scope of the claims that the embodiments added with such alterations or improvements can be included in the technical scope of the present invention.

What is claimed is:

1. A control circuit for controlling an ON period and an OFF period in a switching cycle of a switching element configured to perform switching control of a principal current flowing through a transformer of a switching power source, and performing control to turn off the switching element when an overcurrent is detected after an elapse of an invalidation period in the switching cycle and to set a period in which the switching element is turned on in the switching cycle to be minimum period or more, the control circuit comprising:
a shared timer unit configured to output a first timer signal for defining the invalidation period and a second timer signal for defining the minimum period.

2. The control circuit according to claim 1, wherein start timing of the invalidation period and start timing of the minimum period are common to each other, and
the shared timer unit is configured to time a remaining of the minimum period after the invalidation period has been timed.

3. The control circuit according to claim 2, wherein
start timing of the ON period, the start timing of the invalidation period, and the start timing of the minimum period are common to one another.

4. The control circuit according to claim 2, wherein
the shared timer unit has
a shared capacitor,
a charge and discharge control unit configured to start charge of the shared capacitor at the start timing, and also to control charge and discharge of the shared capacitor,
an invalidation period output unit configured to output, when a voltage of the shared capacitor has become a first setting voltage after the start timing, the first timer signal representing end timing of the invalidation period, and also to discharge the shared capacitor and recharge the shared capacitor, and
a minimum period output unit configured to output, after the shared capacitor is discharged, when the shared capacitor turns to a second setting voltage, the second timer signal representing end timing of the minimum period.

5. The control circuit according to claim 4, wherein
the charge and discharge control unit is configured to cause a value of a charge current for charging the shared capacitor to vary before an end of the invalidation period and after the end of the invalidation period.

6. The control circuit according to claim 4, wherein
the first setting voltage and the second setting voltage are a same voltage.

7. The control circuit according to claim 4, wherein
the invalidation period output unit is a flip-flop to which a first set signal is input in response to the start timing and to which a first reset signal is input when the voltage of the shared capacitor has become the first setting voltage, and which is configured to output the first timer signal,
the minimum period output unit is a flip-flop to which a second set signal is input in response to the start timing and to which a second reset signal is input when the voltage of the shared capacitor has become the second setting voltage, and which is configured to output the second timer signal, and
the control circuit comprises a reset control unit configured to mask an input of the second reset signal to the minimum period output unit from the start timing until an output of the invalidation period output unit shifts in response to the first reset signal.

8. The control circuit according to claim 5, wherein
the charge and discharge control unit is configured to set the charge current after the end of the invalidation period to be lower than the charge current before the end of the invalidation period.

9. The control circuit according to claim 5, wherein
the first setting voltage and the second setting voltage are a same voltage.

10. The control circuit according to claim 5, wherein
the invalidation period output unit is a flip-flop to which a first set signal is input in response to the start timing and to which a first reset signal is input when the voltage of the shared capacitor has become the first setting voltage, and which is configured to output the first timer signal,
the minimum period output unit is a flip-flop to which a second set signal is input in response to the start timing and to which a second reset signal is input when the voltage of the shared capacitor has become the second setting voltage, and which is configured to output the second timer signal, and
the control circuit comprises a reset control unit configured to mask an input of the second reset signal to the minimum period output unit from the start timing until an output of the invalidation period output unit shifts in response to the first reset signal.

11. The control circuit according to claim 8, wherein
the first setting voltage and the second setting voltage are a same voltage.

12. The control circuit according to claim 8, wherein
the invalidation period output unit is a flip-flop to which a first set signal is input in response to the start timing and to which a first reset signal is input when the voltage of the shared capacitor has become the first setting voltage, and which is configured to output the first timer signal,
the minimum period output unit is a flip-flop to which a second set signal is input in response to the start timing and to which a second reset signal is input when the voltage of the shared capacitor has become the second setting voltage, and which is configured to output the second timer signal, and
the control circuit comprises a reset control unit configured to mask an input of the second reset signal to the minimum period output unit from the start timing until an output of the invalidation period output unit shifts in response to the first reset signal.

13. The control circuit according to claim 1, wherein
the switching cycle includes a plurality of switching cycles by repeating the switching cycle in succession,
the control circuit has a determination circuit configured to perform a determination on whether a light load operation is to be performed or a normal operation is to be performed based on a magnitude of an output voltage of the switching power source,
when the light load operation is to be performed, by using the invalidation period and the minimum period, the control circuit is configured to perform control to turn off the switching element when the overcurrent is detected after an elapse of the invalidation period in each of the switching cycles and to set a period in which the switching element is turned on in each of the switching cycles to be the minimum period or more, and
when the normal operation is to be performed, by using the invalidation period without using the minimum period, the control circuit is configured to perform control to turn off the switching element when the overcurrent is detected after the elapse of the invalidation period in each of the switching cycles.

14. The control circuit according to claim 13, wherein
when the light load operation has been implemented in the switching cycle, when the overcurrent is detected after the elapse of the invalidation period but before the minimum period, the switching element is turned off.

15. A switching power source comprising:
a transformer;
a switching element configured to perform switching control of a principal current flowing through the transformer; and
a control circuit configured to control an ON period and an OFF period in a switching cycle of the switching element, and to turn off the switching element when an overcurrent is detected after an elapse of an invalidation period in the switching cycle to control a period in which the switching element is turned on in the switching cycle to be a minimum period or more, wherein
the control circuit has a shared timer unit configured to output a first timer signal for defining the invalidation period and a second timer signal for defining the minimum period.

16. The switching power source according to claim 15, wherein
start timing of the invalidation period and start timing of the minimum period are common to each other, and
the shared timer unit is configured to time a remaining of the minimum period after the invalidation period has been timed.

17. The switching power source according to claim 16, wherein
the shared timer unit has
a shared capacitor,
a charge and discharge control unit configured to start charge of the shared capacitor at the start timing, and also to control charge and discharge of the shared capacitor,
an invalidation period output unit configured to output, when a voltage of the shared capacitor has become a first setting voltage after the start timing, the first timer signal representing end timing of the invalidation period, and also to discharge the shared capacitor and recharge the shared capacitor, and
a minimum period output unit configured to output, after the shared capacitor is discharged, when the shared capacitor turns to a second setting voltage, the second timer signal representing end timing of the minimum period.

18. The switching power source according to claim 17, wherein
the charge and discharge control unit is configured to cause a value of a charge current for charging the shared capacitor to vary before an end of the invalidation period and after the end of the invalidation period.

19. The switching power source according to claim 18, wherein
the charge and discharge control unit is configured to set the charge current after the end of the invalidation period to be lower than the charge current before the end of the invalidation period.

20. The switching power source according to claim 17, wherein
the first setting voltage and the second setting voltage are a same voltage.

* * * * *